US008215550B2

(12) United States Patent
Mok et al.

(10) Patent No.: US 8,215,550 B2
(45) Date of Patent: Jul. 10, 2012

(54) ORIENTING A SCANNING DEVICE WITH RESPECT TO A TARGET LOCATION

(75) Inventors: Swee M. Mok, Palatine, IL (US);
Thomas S. Babin, Lake Zurich, IL (US);
Timothy J. Collins, Homer Glen, IL (US); Julius S. Gyorfi, Vernon Hills, IL (US); Tom Mathew, Skokie, IL (US);
Chuntao Zhang, Streamwood, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 237 days.

(21) Appl. No.: 12/641,570

(22) Filed: Dec. 18, 2009

(65) Prior Publication Data

US 2011/0147455 A1    Jun. 23, 2011

(51) Int. Cl.
*G06F 19/00* (2006.01)
*G06Q 30/00* (2006.01)
*G06Q 90/00* (2006.01)

(52) U.S. Cl. ....................................... 235/385; 235/381

(58) Field of Classification Search .................. 235/385, 235/381, 375, 487
See application file for complete search history.

(56) References Cited

U.S. PATENT DOCUMENTS

| | | | |
|---|---|---|---|
| 5,869,820 A * | 2/1999 | Chen et al. .................. 235/376 |
| 7,042,358 B2 | 5/2006 | Moore | |
| 7,084,769 B2 * | 8/2006 | Bauer et al. ................ 340/572.7 |
| 7,374,096 B2 * | 5/2008 | Overhultz et al. ............ 235/487 |
| 7,448,544 B1 * | 11/2008 | Louie et al. .................... 235/385 |
| 7,504,928 B2 | 3/2009 | Nierenberg et al. | |
| 7,516,890 B1 | 4/2009 | Spremo et al. | |
| 7,525,487 B2 | 4/2009 | Burnside et al. | |
| 7,538,670 B2 | 5/2009 | Smith et al. | |
| 2004/0096083 A1 * | 5/2004 | Matsunaga et al. .......... 382/104 |
| 2005/0149414 A1 | 7/2005 | Schrodt et al. | |
| 2009/0096611 A1 | 4/2009 | Jones | |
| 2009/0182499 A1 | 7/2009 | Bravo | |

* cited by examiner

*Primary Examiner* — Edwyn Labaze

(57) ABSTRACT

Disclosed is a method for a scanning device to tell its user how to best orient the scanning device to scan a target location. The user approaches the target location and initiates a scan. The results of the scan are analyzed and compared to information about the target location. Based on the analysis, the user is told how to re-orient the scanning device, if that is necessary to achieve an acceptable re-scan of the target location. In a preferred embodiment, a screen on the scanning device presents a two-dimensional map based on the scan results and on the known relative locations of the target location and of nearby non-target locations. Locations on the map are highlighted to tell the user the results of the scan and to direct him to re-orient the scanning device if necessary.

18 Claims, 6 Drawing Sheets

| C1R1 | C2R1 | C3R1 |
|------|------|------|
| C1R2 | C2R2 | C3R2 |
| C1R3 | C2R3 | C3R3 |

| C1R1 | C2R1 | C3R1 |
|------|------|------|
| C1R2 | C2R2 | C3R2 |
| C1R3 | C2R3 | C3R3 |

| C1R1 | C2R1 | C3R1 |
|------|------|------|
| C1R2 | C2R2 | C3R2 |
| C1R3 | C2R3 | C3R3 |

# ORIENTING A SCANNING DEVICE WITH RESPECT TO A TARGET LOCATION

FIELD OF THE INVENTION

The present invention is related generally to scanning devices (e.g., RFID and bar-code readers) and, more particularly, to using such devices for establishing location.

BACKGROUND OF THE INVENTION

Shoppers are familiar with the machine-readable tags, such as laser-readable bar codes or Radio Frequency Identification ("RFID") tags, attached to products in stores. These tags are read during checkout, and an accurate list of the items purchased is presented to the user, along with billing information and, sometimes, related advertising.

In addition to making customer check-out faster and more accurate, these product tags help the merchant to track his inventory. By knowing which products and how many of them leave the store, an automated system can place re-stock orders when supplies are running low or alert the merchant when a particular product is selling poorly.

In a related scenario, a merchant or wholesaler actively inventories the stock on hand by scanning the machine-readable tags in a given location (e.g., on a particular shelf in a warehouse). The read-out (from the tags) of the items actually present can be cross-referenced against a list of items presumed to be present (produced by, e.g., an inventory system that tracks products coming into and products leaving a given area). If discrepancies due to theft or due to inaccurate scanning are found, they can be corrected.

Taking inventory by scanning for machine-readable tags placed on the items has some shortcomings, however. In addition to the obvious problems of missing, duplicate, or wrongly applied tags, the nature of the scanning process itself allows for some inaccuracies. When a user initiates a scan from a hand-held scanning device, the device makes a record of all of the tags that it "sees" during the scan. But it is not always certain that the scan registers all of the tags in the location that the user intended to scan and registers none of the tags in locations that the user did not intend to scan. There are several possible reasons for this. Some scanners (e.g., RFID scanners) can identify tags at a wide angle from the direction in which the scanner is pointing when the scan is initiated. Also, the range of the scan can vary from moment to moment depending on environmental circumstances. (Radio noise can limit the effective range of radio-based scans, while dust can limit laser scans.) These and other characteristics of the scanners typically in use today mean that the user may not know exactly the scope of the scan. For example, the user may wish to inventory the products on one shelf in a warehouse. However, if the user is not very careful with positioning and pointing the scanner during the scan, the scanner may miss some of the items on the shelf or may pick up items on other, nearby, shelves.

BRIEF SUMMARY

The above considerations, and others, are addressed by the present invention, which can be understood by referring to the specification, drawings, and claims. According to aspects of the present invention, a scanning device tells its user how to best orient the scanning device to scan a target location. (For example, the target location can be a shelf or a bin in a warehouse, the location marked with RFID chips or laser-readable bar-codes.) The user approaches the target location and initiates a scan. The results of the scan are analyzed and compared to information about the target location. (This information may be downloaded to the scanning device from a central server that hosts a database of location information for the premises.) Based on the analysis, the user is told how to re-orient the scanning device, if that is necessary to achieve an acceptable re-scan of the target location.

For example, if the scan results include the target location but also include a location other than the target location, then the orientation of the scanning device was close to acceptable but not quite good enough. The central server knows the relative locations of the target location and of the scanned non-target locations. Based on this information, the user is told how to re-orient the scanning device so that the next scan reads the target location but not the non-target locations.

Some scanning technologies provide a measurement of distance from the scanning device to the scanned tag. For RFID tags, some scanners record the strength of the signal returned from every RFID tag seen during the scan, and this signal strength serves as a proxy for the distance. Other proxy distance measurements are possible for this and for other scanning technologies. Some embodiments of the present invention use these distance measurements to, for example, ignore scanned tags that are farther away than a threshold distance. Also, a scan may be deemed to be acceptable when the target location is closer by a significant amount than any non-target scanned location.

Several possibilities are contemplated for a user interface that tells the user the results of a scan. A very simple interface could present a sound or light that tells the user roughly how close he is to an acceptable orientation. (E.g., a red light means the scan did not read the target location at all; yellow means the target location was read but so too were non-target locations; and green means the scanner orientation was acceptable.) In a preferred embodiment, a screen on the scanning device presents a two-dimensional map based on the scan results and on the known relative locations of the target location and of nearby non-target locations. Locations on the map are highlighted to tell the user the results of the scan and to direct him to re-orient the scanning device if necessary.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

FIGS. 4a, 4b, and 4c are drawings of an exemplary user interface on a scanning device.

DETAILED DESCRIPTION

Figure 1A:
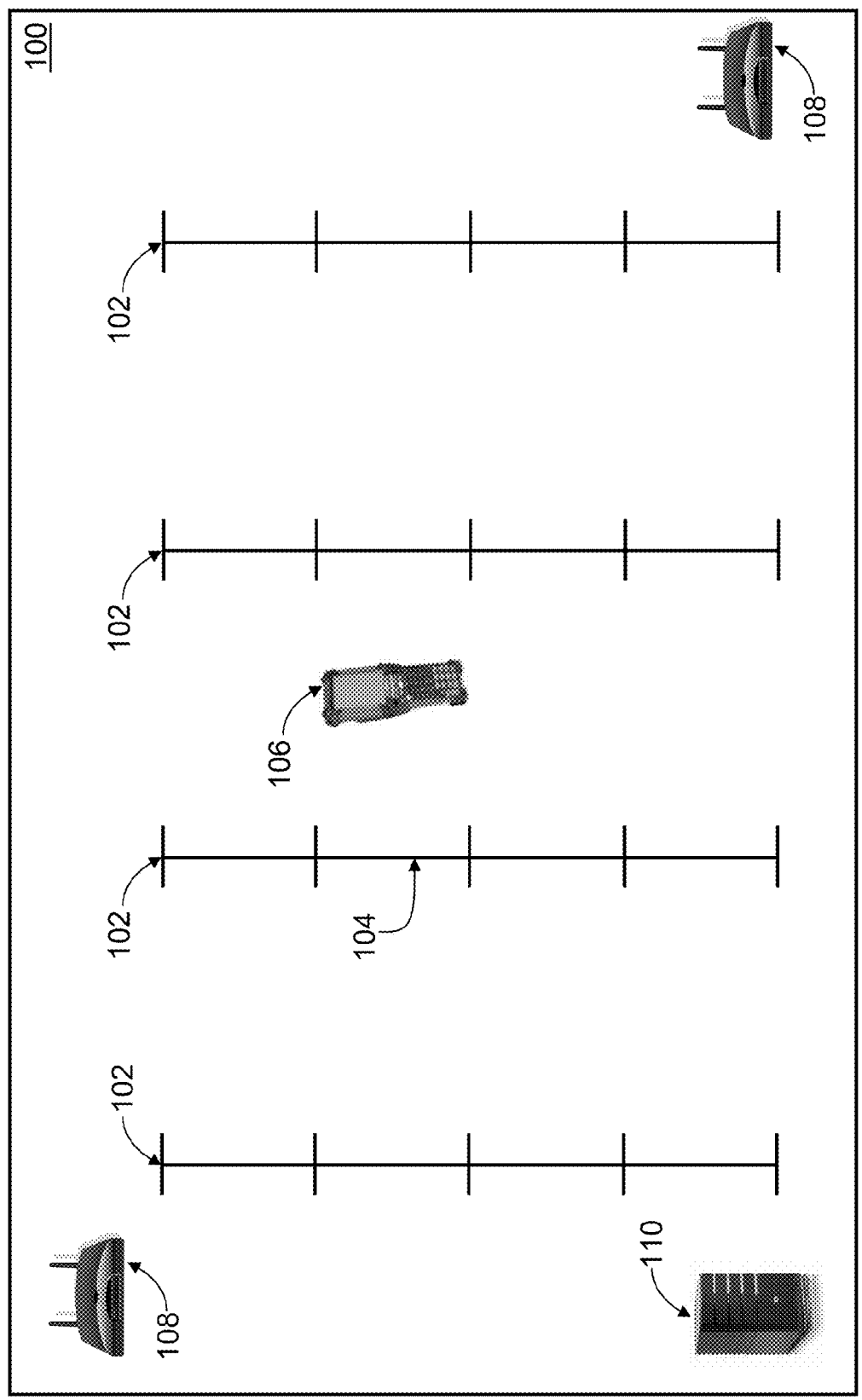
FIGS. 1a and 1b are overviews of a representational environment in which the present invention may be practiced.

Turning to the drawings, wherein like reference numerals refer to like elements, the invention is illustrated as being implemented in a suitable environment. The following description is based on embodiments of the invention and should not be taken as limiting the invention with regard to alternative embodiments that are not explicitly described herein.

FIG. 1a presents a stylized layout of a typical warehouse or store 100. A warehouse 100 often includes numerous rows 102 of shelves or bins 104. To allow the warehouser to track the merchandise, each type of merchandise is assigned to be stored on one or more particular shelves 104.

Inventorying the merchandise stored in the warehouse 100 is an ongoing task. As part of the inventory process, the contents of the shelves 104 are checked to make sure that all of the merchandise is properly stored and to check that the expected amount of merchandise is present in the warehouse 100. To perform the inventory, a user is given a hand-held scanning device 106. The scanning device 106 scans for tags affixed to the merchandise and records the tags found during the scan. Some scanning devices 106 use a laser to read bar-code tags (e.g., the UPC tags found on grocery-store items); other scanning devices 106 use a radio to read RFID tags.

The scanning device 106 may communicate with one or more wireless hubs 108 (e.g., Wi-Fi hubs) installed throughout the warehouse 100. The scanning device 106 can communicate through the hubs 108 to a central server 110 that contains inventory information and a current map of the shelves in the warehouse 100. In many embodiments, the scanning device 106 holds a current map of the entire warehouse 100; the map is updated as needed by the central server 110. The central server 110 can send commands to the user of the scanning device 106 and can receive the results of the scans.

When the user wishes to inventory the items stored on a particular shelf 104 (called the "target shelf" or "target location"), the user orients the scanning device 106 and initiates a scan. However, the scan will be accurate only if the user correctly orients the scanning device 106 with respect to the target location 104 during a scan. If the scanning device 106 is not correctly oriented, then the scan may miss items actually present on the target shelf 104 or may register items on neighboring shelves.

Figure 1B:
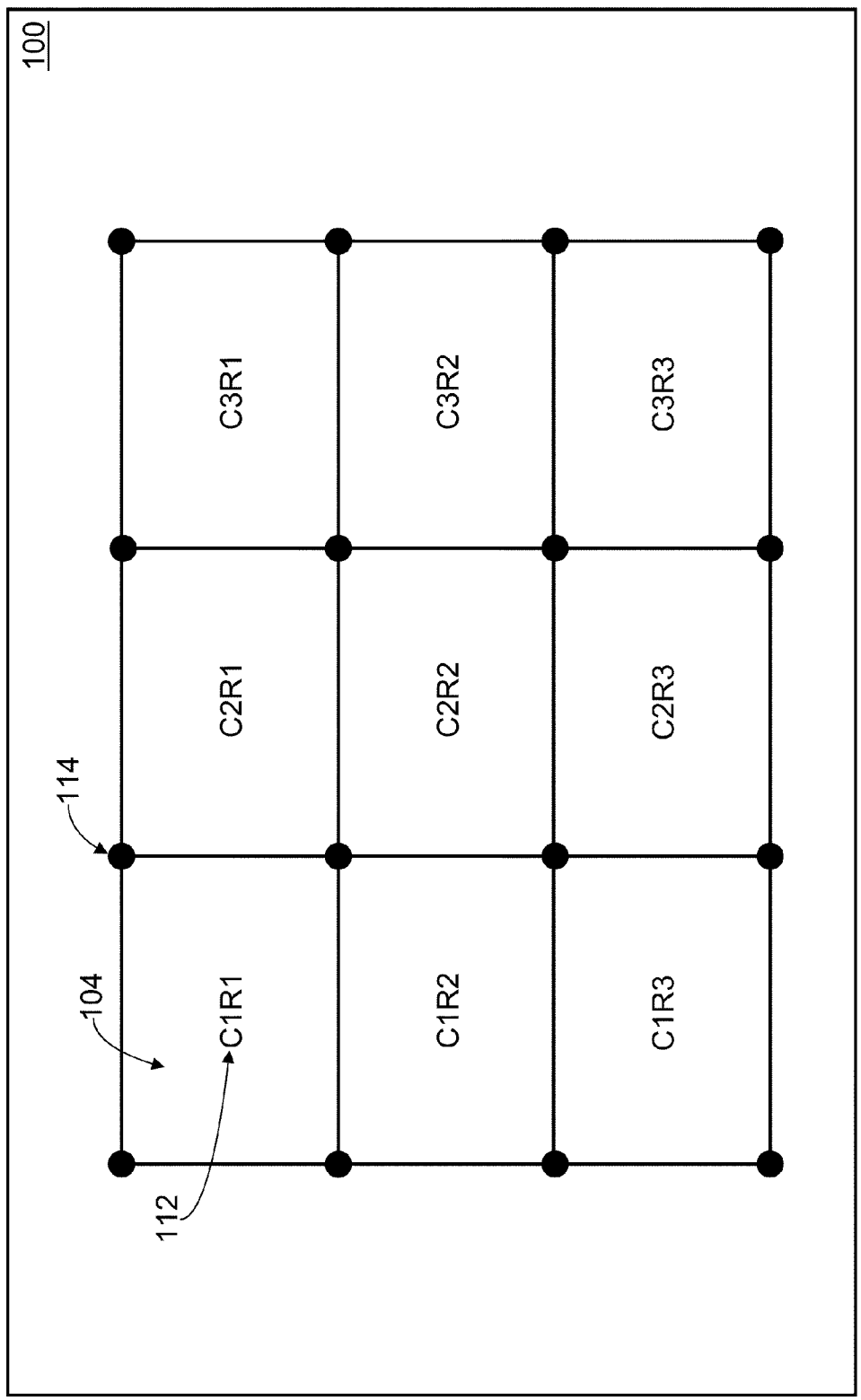

Aspects of the present invention help the user to correctly orient the scanning device 106 so that he can get an accurate scan of the target location 104. FIG. 1b shows an array of shelves 104. To facilitate proper orienting of the scanning device 106, the shelves are tagged with RFID or laser-scan tags 114. (FIG. 1b shows one embodiment of the tagged shelves 104, but the positioning and number of tags 114 can be varied to optimize the detection of the tags 114, the variations among embodiments based on particularities of the scanning environment.) As explained in greater detail below, a scan registers these tags 114 (as well as registering tags on merchandise). The scanning of these tags 114 is used to determine, and to correct if necessary, the orientation of the scanning device 106 with respect to the target location 104. Note that the labels 112 on the shelves 104 (e.g., "C1R1" for "column 1, row 1") are for purposes of the present discussion and need not actually appear on the shelves 104 in the warehouse 100.

Figure 2:
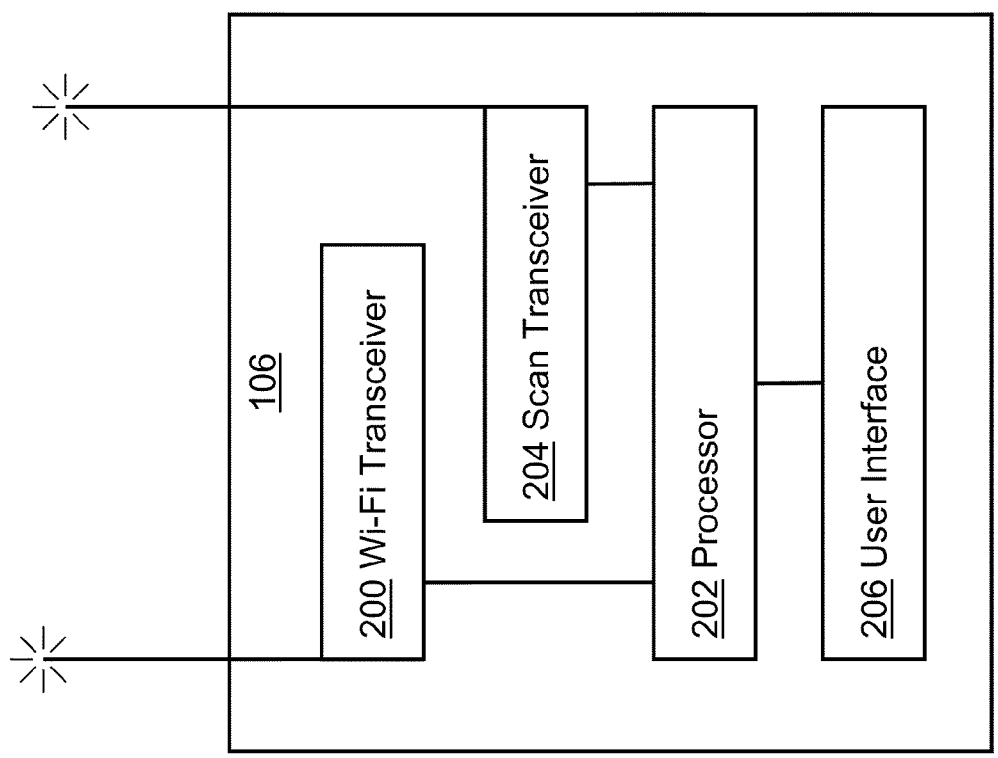
FIG. 2 is a schematic drawing of an exemplary scanning device.

FIG. 2 shows some relevant elements of a typical scanning device 106. A transceiver 200 allows communication with the hubs 108 for communication with the central server 110 and for roughly determining the position of the scanning device 106, as discussed below. A second transceiver 204 performs the scan (laser or radio). A processor 202 runs the two transceivers 200, 204 and controls a user interface 206. The user interface 206 receives commands from the user (e.g., a command to initiate a scan) and presents results of the scan. Embodiments of the user interface 206 are discussed below.

Figure 3A:
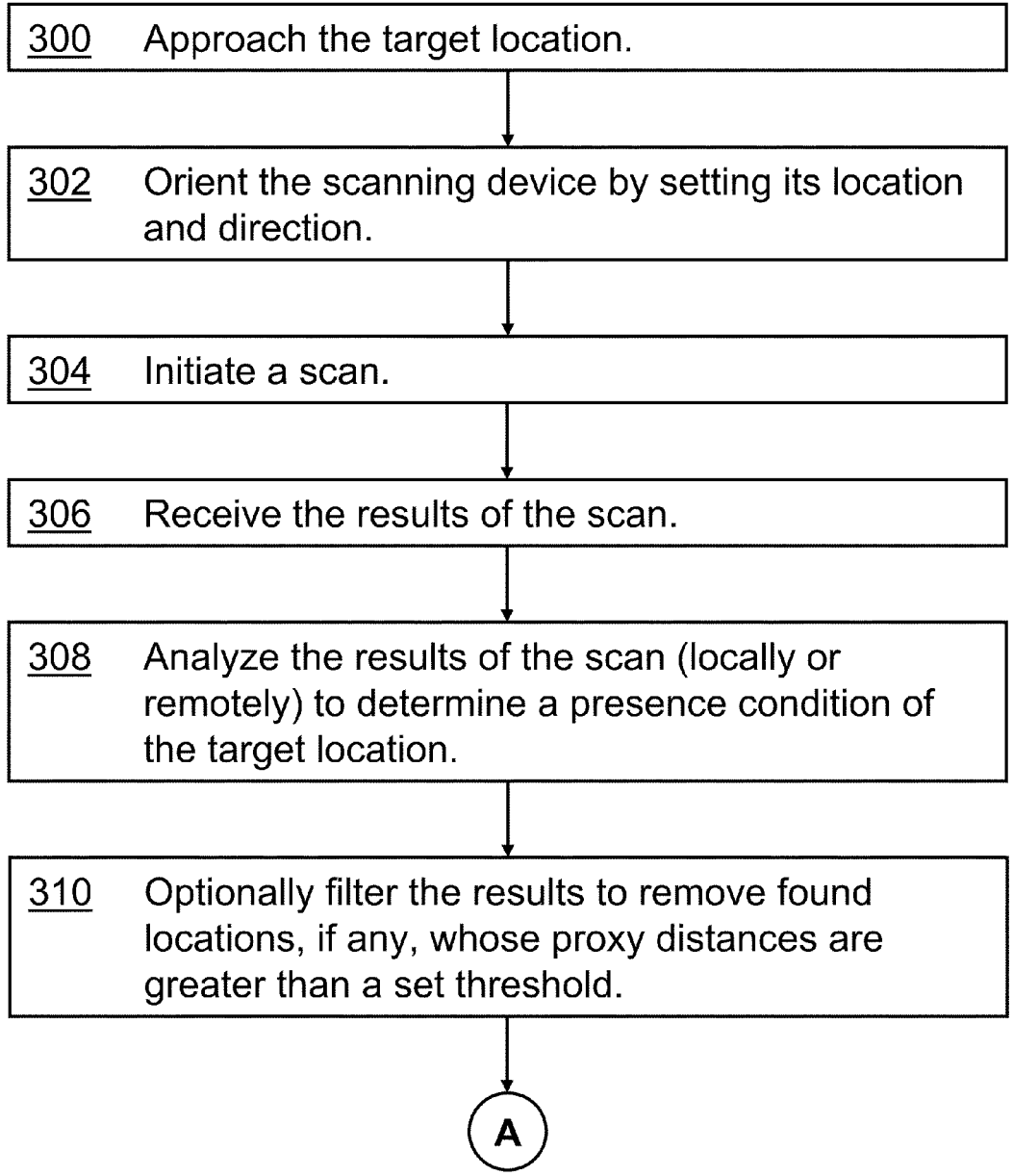
FIGS. 3a and 3b together are a flowchart of an exemplary method for orienting a scanning device with respect to a target location.
Figure 3B:
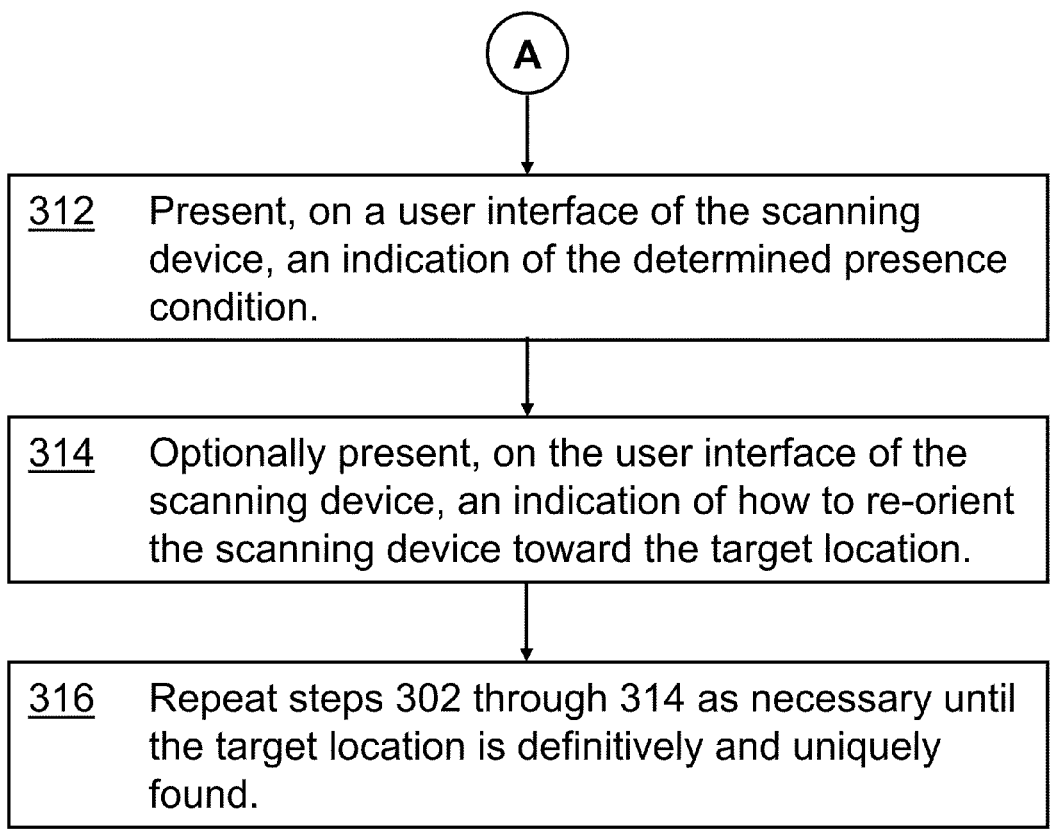

The flowchart of FIGS. 3a and 3b presents one embodiment of the methods of the present invention. The user of the scanning device 106 is told to scan a particular shelf 104. (The command could come from the central server 110 and be delivered to the scanning device 106 via a hub 108.) In step 300, the user approaches the target location 104. For example, the user may have in his head the general layout of the warehouse 100 and may know how to get reasonably close to the target location 104. Also, for many warehouses 100 a map has been made that correlates received signal strengths from the wireless hubs 108 with a physical location in the warehouse 100. Using this map, the scanning device 106 can analyze the signals it is receiving from the hubs 108 and know its rough location in the warehouse 100. The scanning device 106 can then tell the user how to come close to the target location 104. (Generally speaking, GPS does not work very well in a typical warehouse 100.) In some embodiments, the central server 110 knows approximately where the user is currently standing (e.g., near the previous target location) and can send instructions to the user to get him close to the next target location 104. At the end of step 300, the user is within a couple of meters of the target location 104.

For purposes of the present discussion, assume that the user is now facing the array of shelves shown in FIG. 1b, and assume that the target location is C2R1. FIGS. 4a, 4b, and 4c illustrate one possible user interface 206 of the scanning device 106. On a screen of the scanning device 106 is shown a two-dimensional display of the local environment. In FIG. 4a, the target location C2R1 is highlighted for the user. (In actual embodiments, the highlighting can be a bright color, e.g., blue, rather than the diagonal stripes of FIG. 4a.) A simpler alternative user interface 206 is described below.

In step 302, the user orients the scanning device 106 as best he can with respect to the target location 104 and, in step 304, initiates a scan.

The scanning device 106 receives the results of the scan in step 306. At a minimum, the results of the scan include a list of tags read during the scan. In some embodiments, an actual distance or a "proxy" distance is associated with each tag on that list. This measures the approximate distance from the scanning device 106 to the tag at the time of the scan. A measurement is a "proxy" distance when the scanning technology does not measure this distance directly. Some RFID technologies record the strength of the signal returned from each tag read during the scan, and this signal strength can be used as a proxy distance measurement (of course, a weaker signal means a greater proxy distance). Other RFID technologies run a sequence of scans at different power levels to measure proxy distances. Tags read with a lower power are considered to be nearer than tags that can only be read with a higher power. Other proxy distance measurements are possible and may be used. When scanning devices 106 that determine actual distances become more widespread, their distance measurements can replace these proxy distances. While distance measurements, whether actual or proxy, are very useful (see step 310 below), embodiments of the present invention are also useful even with scanning devices 106 that provide no distance measurements of any kind.

In step 308, the results of the scan are analyzed, either locally by the processor 202 of the scanning device 106 or remotely by the central server 110. Because any merchandise tags registered during the scan are irrelevant for purposes of properly orienting the scanning device 106, these tags are ignored for now, and the following discussion only concerns those tags 114 affixed to specific shelves 104.

Properly speaking, step 310 is an optional part of the analyzing step 308. If distance measurements are available (either actual or proxy), then those tags 114 read during the scan that are too far away (e.g., more than a first threshold distance away) can be ignored during the analysis of step 308.

The set of location tags 114 read during the scan (excluding the tags filtered-out in step 310, if any) is analyzed in step 308 to determine whether or not the orientation of the scanning device 106 during the scan was appropriate. In general, there are three possible results of this analysis (that is, three possible "determined presence conditions" of the target location 104): (1) The target location 104 was not definitively found. ("Definitive" here means that the signal strength of the target location 104 is greater than the first threshold mentioned above.) (2) The target location 104 is found definitively but not uniquely. (3) The target location 104 is found both definitively and uniquely. Result (3) is the desired one.

Different analysis algorithms can be used to characterize the results of the scan into one of the three possible presence conditions mentioned above. As a simple example, the target location 104 is found definitively and uniquely if its location tag 114 is the one and only location tag remaining on the scan list. If proxy distances are available, then the target location 104 can also be found definitively and uniquely if (a) its location tag 114 is on the list and (b) the proxy distance for the target location's tag 114 is less, by at least a threshold amount, than the distance of any other location tag on the list.

Again if distance measurements are available, the target location 104 is found definitively but not uniquely if (a) its location tag 114 is on the list and (b) the proxy distance for the target location's tag 114 is not less, by at least the threshold amount, than the distance of at least one other location tag on the list.

In step 312, the determined presence condition of the target location 104 is presented to the user via the user interface 206 of the scanning device 106. A very simple user interface 206 could simply indicate which of the three possibilities applies. For example, a "stoplight" could be shown: Red means not definitively found, Yellow means found definitively but not uniquely, and Green means found definitively and uniquely. Alternatively, a specific sound could be played to indicate the determined presence condition.

A more useful two-dimensional interface 206 is illustrated in FIGS. 4a, 4b, and 4c. In this interface, the boxes representing the nearby shelves are colored to indicate the determined presence condition. In one embodiment, the following rules are used for the coloring:

Color gray any shelf whose location tag 114 either was not read during the scan or that was excluded from consideration in step 310. Also, color all shelves gray if the target location 104 was not read during the scan.

If the target location 104 was read during the scan, then:
Color yellow any shelf whose location tag 114 generated a fairly strong signal (e.g., above a second threshold).
If the target location 104 returned a very strong signal (e.g., above a third threshold), and if that signal is significantly stronger than the signals returned by neighboring locations, then color green any shelf whose location tag 114 generated a very strong signal.
If more than one green shelf is found, then re-assign the green shelves to yellow.

Using these rules, the orientation of the scanning device 106 was close but not exact (i.e., the target location 104 was found definitively but not uniquely) if the user interface 106 shows a number of yellow boxes. FIG. 4b shows this possibility (pretend that the boxes representing shelves C2R1 and C2R2 are colored yellow). FIG. 4c shows the case where the target location 104 was found definitively and uniquely (box C2R1 is colored green).

The specific user interface 206 of FIGS. 4a, 4b, and 4c illustrates a useful function not available with the simpler "stoplight" interface. Consider FIG. 4b. The user, on seeing this on the screen of the scanning device 106, knows not only that the most recent scan was close but not quite good enough, but he also sees what was wrong with the scan. Clearly, the scanning device 106 that produced the results of FIG. 4b was pointed too low. Thus, this user interface 206 can tell the user (in step 314) how to correct the orientation of the scanning device 106 to get a better scan.

In step 316, the user repeats the scan, if necessary, until a good result (target location 104 found definitively and uniquely) is achieved. When a good result is achieved, the user knows that the list of merchandise tags found in the scan (the list filtered, as appropriate, for actual or proxy distance) truly represents the entire contents of the target location 104 and does not include merchandise tags from neighboring shelves. Of course, the methods of the present invention are not limited to the case of taking inventory but are useful whenever a target location needs to be scanned for whatever reason.

In view of the many possible embodiments to which the principles of the present invention may be applied, it should be recognized that the embodiments described herein with respect to the drawing figures are meant to be illustrative only and should not be taken as limiting the scope of the invention. For example, other user interfaces employ other formats to present the scan results. Therefore, the invention as described herein contemplates all such embodiments as may come within the scope of the following claims and equivalents thereof.

We claim:

1. A method for orienting a hand-held scanning device with respect to a target location, the method comprising:
   orienting the hand-held scanning device, the orienting comprising setting a location of the hand-held scanning device and setting a direction of the hand-held scanning device;
   initiating, by the hand-held scanning device, a scan;
   receiving, by the hand-held scanning device, results of the scan;
   analyzing the received results of the scan to determine a presence condition of the target location, the presence condition based, at least in part, on the received results of the scan, wherein the presence condition is selected from the group consisting of:
      (a) the target location is not definitively found,
      (b) the target location is found definitively but not uniquely, and
      (c) the target location is found definitively and uniquely;
   presenting to a user interface of the hand-held scanning device, by the hand-held scanning device, an indication of the determined presence condition; and
   repeating, when necessary, orienting the hand-held scanning device based on an indication, presented by the user interface, of how to re-orient the hand-held scanning device toward the target location, initiating a scan, receiving results of the scan, analyzing the received results, and presenting an indication until the determined presence condition of the target location is presence condition (c) above.

2. The method of claim 1 wherein the hand-held scanning device is selected from the group consisting of: an RFID scanner and a laser scanner.

3. The method of claim 1 wherein the target location is selected from the group consisting of: a shelf and a bin.

4. The method of claim 1 wherein analyzing the received results of the scan comprises producing a list of zero or more locations found by the scan.

5. The method of claim 4:
wherein condition (a) is determined when the list does not include the target location;
wherein condition (b) is determined when the list includes the target location and at least one other location; and
wherein condition (c) is determined when the list includes the target location and no other locations.

6. The method of claim 4 wherein the list further comprises, for each location on the list, a proxy for a distance between the location and the hand-held scanning device.

7. The method of claim 6 wherein the distance proxy for a location on the list is based, at least in part, on a selection from the group consisting of: a distance measured between the location and the hand-held scanning device, a strength of a returned signal associated with the location, and an indication of a lowest-power scan that found the location.

8. The method of claim 6 further comprising:
filtering the list to remove locations, if any, whose proxy distances are above a first threshold.

9. The method of claim 8:
wherein presence condition (a) is determined when the filtered list does not include the target location;
wherein presence condition (b) is determined when the filtered list includes the target location, when the filtered list includes at least one other location, and when the proxy distance associated with the other location is not greater by a second threshold than a proxy distance associated with the target location; and
wherein presence condition (c) is determined when the filtered list includes the target location and when either the filtered list includes no other locations or proxy distances associated with all other locations on the filtered list are greater by the second threshold than the proxy distance associated with the target location.

10. The method of claim 4 wherein presenting, to the user interface, an indication of the determined presence condition comprises:
presenting a two-dimensional map of locations;
when presence condition (b) is determined, then highlighting a plurality of areas on the two-dimensional map corresponding to locations on the list; and
when presence condition (c) is determined, then highlighting an area on the two-dimensional map corresponding to the target location.

11. The method of claim 1 wherein analyzing the received results of the scan is performed, at least in part, on a compute server remote from the scanning device.

12. The method of claim 1 wherein presenting comprises presenting a light or a sound indicating the determined presence condition.

13. The method of claim 1 further comprising:
before orienting, receiving information about the target location from a compute server remote from the hand-held scanning device.

14. The method of claim 1 further comprising:
before orienting, presenting to the user interface, by the hand-held scanning device, instructions on how to get near the target location.

15. A hand-held scanning device comprising:
a user interface configured for initiating a scan and for presenting an indication of a determined presence condition of a target location;
a scan transceiver configured for transmitting the scan and for receiving results of the scan;
a processor operatively connected to the user interface and to the scan transceiver and configured for analyzing the received results of the scan to determine a presence condition of the target location, the presence condition based, at least in part, on the received results of the scan, wherein the presence condition is selected from the group consisting of:
(a) the target location is not definitively found,
(b) the target location is found definitively but not uniquely, and
(c) the target location is found definitively and uniquely; and
the user interface is further configured for presenting an indication of how to re-orient, when necessary, the hand-held scanning device toward the target location.

16. The hand-held scanning device of claim 15 wherein presenting comprises presenting a light or a sound indicating the determined presence condition.

17. The hand-held scanning device of claim 15 wherein presenting an indication of a determined presence condition comprises:
presenting a two-dimensional map of locations;
when presence condition (b) is determined, then highlighting a plurality of areas on the two-dimensional map corresponding to locations on the list; and
when presence condition (c) is determined, then highlighting an area on the two-dimensional map corresponding to the target location.

18. The hand-held scanning device of claim 15 further comprising:
a communications transceiver operatively connected to the processor and configured for receiving information about the target location from a compute server remote from the hand-held scanning device.

* * * * *